Aug. 16, 1966   R. W. GRETTER ETAL   3,266,353
EQUIPMENT FOR RETRIEVING UNDERWATER CABLE
Filed March 30, 1965   10 Sheets-Sheet 1

INVENTORS R.W. GRETTER
J.W. STONER, JR.
G.O. VOIGT

BY Stoddard

ATTORNEY

United States Patent Office 3,266,353
Patented August 16, 1966

3,266,353
EQUIPMENT FOR RETRIEVING UNDER­WATER CABLE
Ralph W. Gretter, Mountainville, John W. Stoner, Jr., Clark, and Gottfried O. Voigt, Westfield, N.J., assignors to Bell Telephone Laboratories, Incorporated, New York, N.Y., a corporation of New York
Filed Mar. 30, 1965, Ser. No. 443,911
22 Claims. (Cl. 83—27)

This invention relates to improved grappling equipment for retrieving ocean communication cable and, more particularly, to a method and apparatus for inserting a hoist line in series with an underwater cable. The invention is especially useful when it is applied to the process of retrieving submarine cable laid in deep water.

As is well known in the art, ocean communication cable, which is also known as underwater or submarine cable, extends usually between different continents and is laid on the floor of an ocean where it is subjected to the hazard of becoming damaged by various causes, such as by the action of marine organisms or by becoming fouled in trawling gear operated by fishing boats. In addition, there may be failures of electronic assemblies, such as repeaters and equalizers, which are commonly connected into the cable at spaced intervals along its length. Thus, any one of a number of factors may make it necessary to find an underwater cable and pull it up above the surface of the water so that it can be examined and repaired. The process of finding a cable and pulling it up is called "cable-retrieval" or "cable-recovery."

In general, underwater cables have been retrieved by means of grapnels dragged by cable-recovery ships. The usual procedure is firstly to estimate the approximate latitude and longitude of the particular cable portion that is to be retrieved. This can be accomplished by referring to the operational record that was made when the cable was laid. After the approximate position of the cable has been determined, a cable-recovery ship is sent to this location and a grapnel is lowered to the ocean floor.

The ship is then caused to travel back and forth in this area while dragging the grapnel in directions that are at right angles to the estimated axial direction of the cable. When the cable is eventually caught or engaged by the grapnel, the grapnel and the engaged portion of the cable are pulled up to the ship so that this section of the cable can be examined and repaired on the deck of the ship. After the necessary repairs have been made, this section of the cable is returned to its former position on the ocean floor.

It can be understood from the above brief description of the cable-retrieval procedure that what is actually pulled up to the cable-recovery ship is a loop or bight of the cable. It is obvious that the length of any particular loop of cable which is retrieved will depend upon the depth of the ocean at that specific location. From this it can be seen that, when cable-retrieval operations are performed in a deep portion of the ocean, an extremely long length of cable loop will be pulled up. In forming this long loop, each of the cable sections which adjoin the opposite ends of the loop are of necessity pulled taut over a considerable distance.

This disturbance of the adjoining cable sections is very detrimental because, when an ocean communication cable is being laid initially, considerable care is exercised during the cable-laying process to insure that a calculated degree of slack in the cable is maintained in order to enable the cable to conform properly to irregularities, especially depressions, in the contour of the ocean floor. The reason for having this slack is that, when the cable is laid in this manner, it is less apt to be caught by trawling gear operated by fishing boats. It can be understood that, when grappling operations eliminate the slack in a section of a cable, this portion of the cable will not conform to the contour of the ocean floor because it will be pulled up out of depressions and will be stretched taut above them thereby becoming susceptible to being caught by trawling gear.

It is not practical to attempt to avoid this situation by laying the cable initially with a surplus degree of slack because an ocean cable may have a length of 3,000 miles and any unnecessary length of cable that is laid would further increase the very substantial cost of this cable. Furthermore, since ocean cable has an inherent curvature due to the fact that it is initially kept in large coils, it has been found that, when cable is laid with an excessive degree of slack, the cable has a tendency to form kinks or loops which may assume vertical positions thereby becoming liable to being caught by trawling gear.

Accordingly, it is an object of this invention to provide improved equipment and an improved method or process for retrieving ocean cable.

Another object of this invention is to provide an improved grapnel for recovering ocean cable.

An additional object is to minimize the disturbance of slack in an ocean cable during the process of retrieving a portion of the cable.

A further object is to provide a cable-retrieving grapnel with improved means for severing an engaged cable.

Another object is to provide a cable-retrieving grapnel with means for grasping and retaining both ends of a cable severed thereby.

Still another object is to provide underwater means for introducing slack into an ocean communication cable.

It is also an object of this invention to provide means for automatically inserting a hoist line in series with an underwater cable during the process of severing the cable with means carried by a grapnel.

These and other objects of the invention are attained by employing a grapnel having flukes which are each adapted to guide an engaged or hooked cable into a slot in the body of the grapnel. Here, the weight or tension of the cable causes tension-responsive means inside the grapnel to apply positive gripping devices to opposite sides of the hooked portion of the cable. In other words, the two portions of the cable that are adjacent to the slot are each securely gripped and held by a respectively different one of the gripping devices.

Each of the cable grippers is fastened to a respectively different end of a composite hoist line which has an intermediate portion that is connected to the grapnel by a coupling device. The middle part of this composite hoist line is secured to a grappling line extending upward to a cable-recovery ship. Thus, the engagement of the grippers with the cable functions to connect the composite hoist line in parallel with the cable. The composite hoist line is made considerably longer than the length of the cable section that it bridges for the purpose of introducing slack into the cable when the cable is subsequently severed.

After the hoist line has been connected to the ocean communication cable, the grappling line is pulled upward toward the ship. During the process of raising or lifting the cable from the ocean floor, the length of cable that is lifted will progressively increase thereby increasing the weight or tension applied to the grapnel. The above-mentioned tension-responsive means carried inside the grapnel respond to this increase in the load applied to the grapnel and effect the operation of cutting means, such as guillotine blade, for severing that part of the cable which is held in the above-mentioned slot.

In effect, this functions to place the hoist line in series with the cable. Due to the considerable length of the hoist line, its insertion in series with the cable serves to introduce additional slack into the cable. Accordingly, the grappling line can now be pulled upward without pulling or disturbing the main portions of the cable that are on the ocean floor.

These and other features of the invention are more fully discussed in connection with the following detailed description of the drawing, in which.

Figures 1, 2:
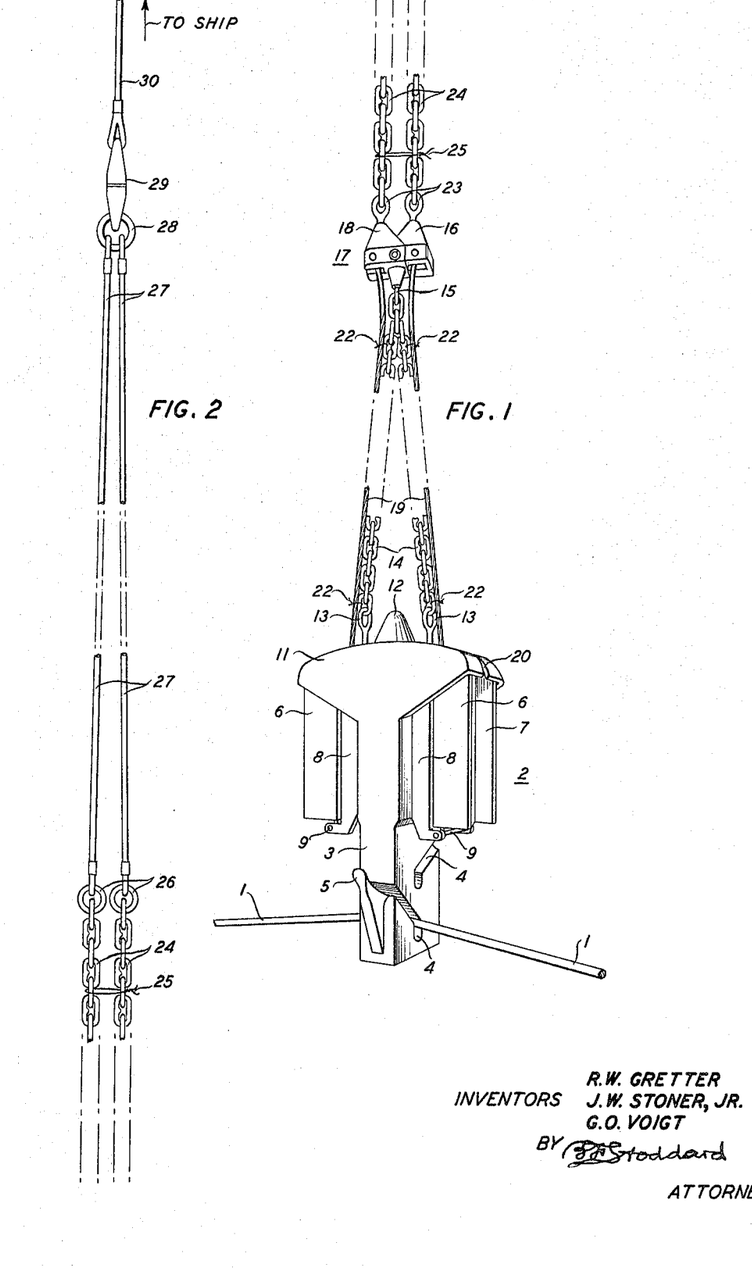
FIG. 1 is a three-dimensional view of an improved grapnel in accordance with this invention together with a section of an ocean communication cable engaged thereby and showing the cable grippers in their normally unoperated positions together with portions of the composite hoist line.
FIG. 2 is a continuation of FIG. 1 in that it shows the remaining portions of the composite hoist line and its connection to a grappling line extending upward toward a ship.

The major elements and the method of operation of an exemplary embodiment of the invention will now be described with reference to FIGS. 1 to 5, inclusive. In FIG. 1, a section of an underwater communication cable 1 is represented as being caught or engaged by a grapnel 2 having a body 3 of a suitable material, such as a machined alloy steel casting. Two cable slots 4 are formed in opposite sides of the body 3 for guiding the engaged cable 1 to the centerline of the body 3.

The cable 1 is initially caught or hooked by one of two flukes 5 each of which projects outwardly from the opening of a respectively different one of the cable slots 4. Each of the flukes 5 is mounted in a respectively different one of two other slots which are perpendicular to their respectively associated cable slots 4. Each fluke 5 is held in its respective slot by two bolts. One bolt in each pair is designed to shear in response to the application of a preassigned load. Accordingly, if a fluke 5 should become caught on a rock or other obstacle, its weak bolt would shear. This permits the fluke 5 to rotate or pivot about its other bolt thereby freeing itself from the obstacle.

Figure 3:
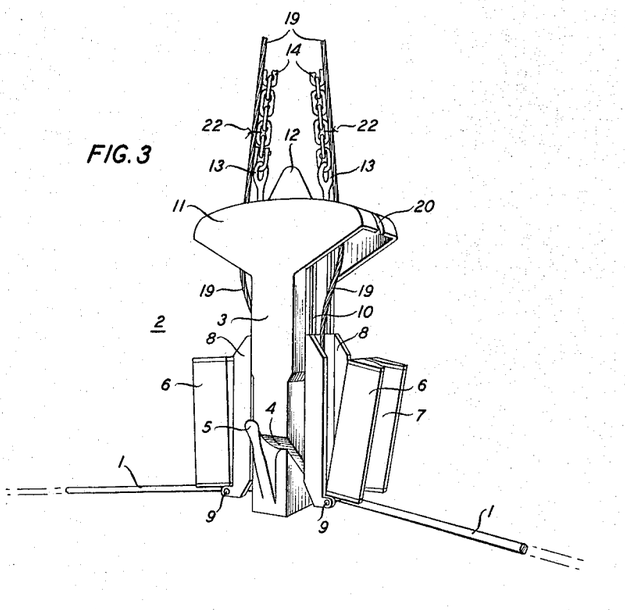
FIG. 3 is another perspective view of the grapnel but with the cable grippers illustrated in an activated condition for moving into engagement with the cable.
Figure 4:
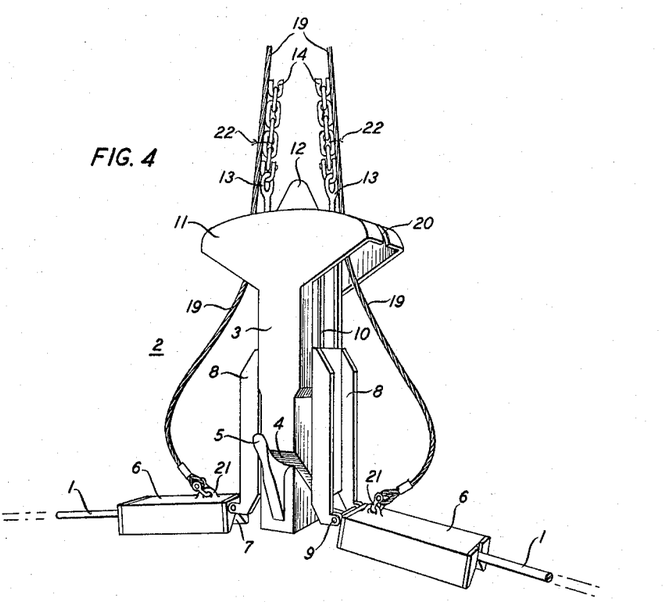
FIG. 4 is a similar perspective view of the grapnel but with the cable grippers represented as having engaged the adjacent portions of the cable for connecting the composite hoist line in parallel with the cable.

Two cable grippers 6 are carried by the grapnel 2 in positions normally above the slots 4. In this embodiment of the invention, each of the grippers 6 has a length of approximately two feet. Each gripper 6 has two guide plates 7 which are pivotally attached thereto at 45 degree angles, as is best seen in FIG. 3, for receiving therein the cable 1 as is represented in FIG. 4. The cable grippers 6 are pivotally mounted on carriages 8 by means of pins 9 which are adapted to shear when an assigned tension is applied to them.

Figure 5:
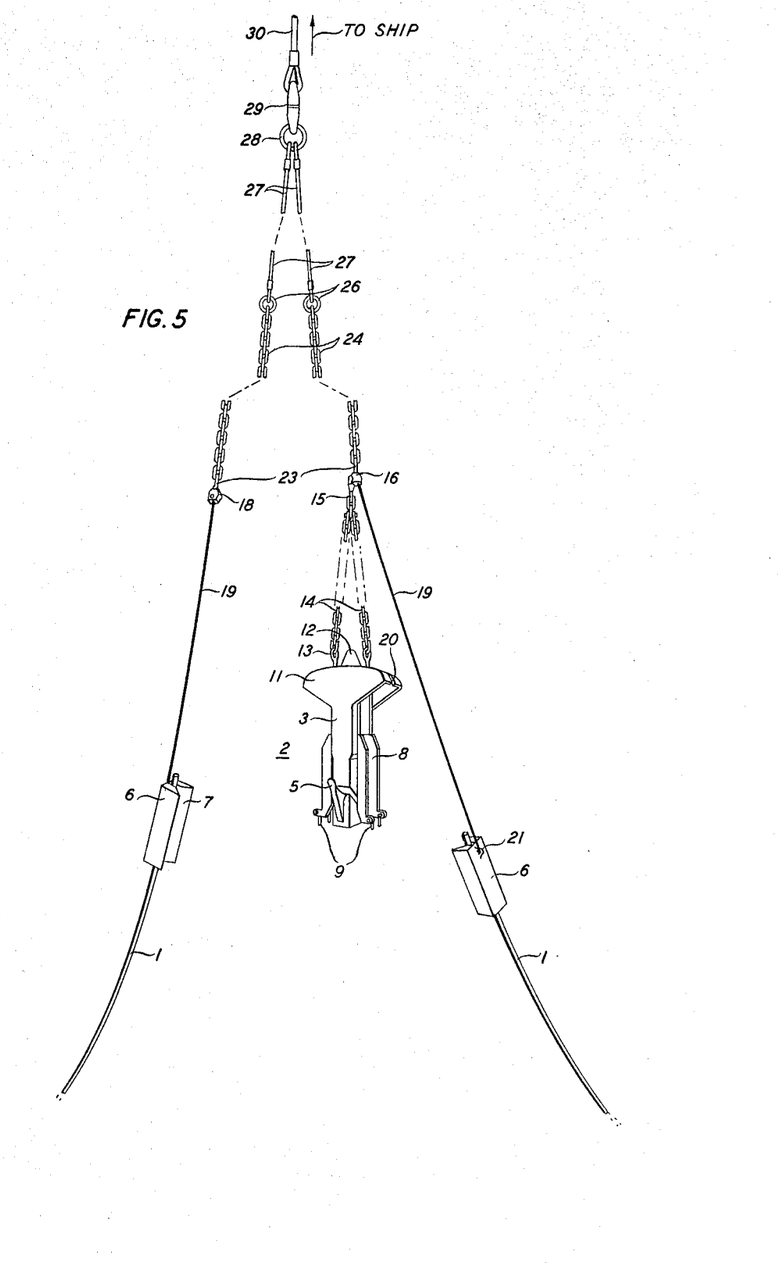
FIG. 5 is still another perspective view of the grapnel but on a smaller scale and showing the composite hoist line connected in series with the cable and between the severed ends thereof.

The carriages 8 are adapted to slide up and down in slightly recessed portions of the grapnel body 3. These recessed portions are provided with guide slots 10, as is best seen in FIGS. 3 and 4. In order to guide their sliding movement, the carriages 8 are equipped with means which project into the guide slots 10. These means also function to attach the carriages 8 to the grapnel body 3. Thus, the carriages 8 remain attached to the grapnel body 3 after the cable grippers 6 have separated therefrom, as is indicated in FIG. 5, in response to the cutting of the cable 1.

Normally, the carriages 8 are held in elevated positions, as is shown in FIG. 1, by means illustrated in FIG. 7 and described hereinafter. In this situation, a hood 11 encloses the tops of the unoperated cable grippers 6 so as to prevent them from moving outward at this time. The hood 11 also shields the grippers 6 during dragging operations.

Figure 8:
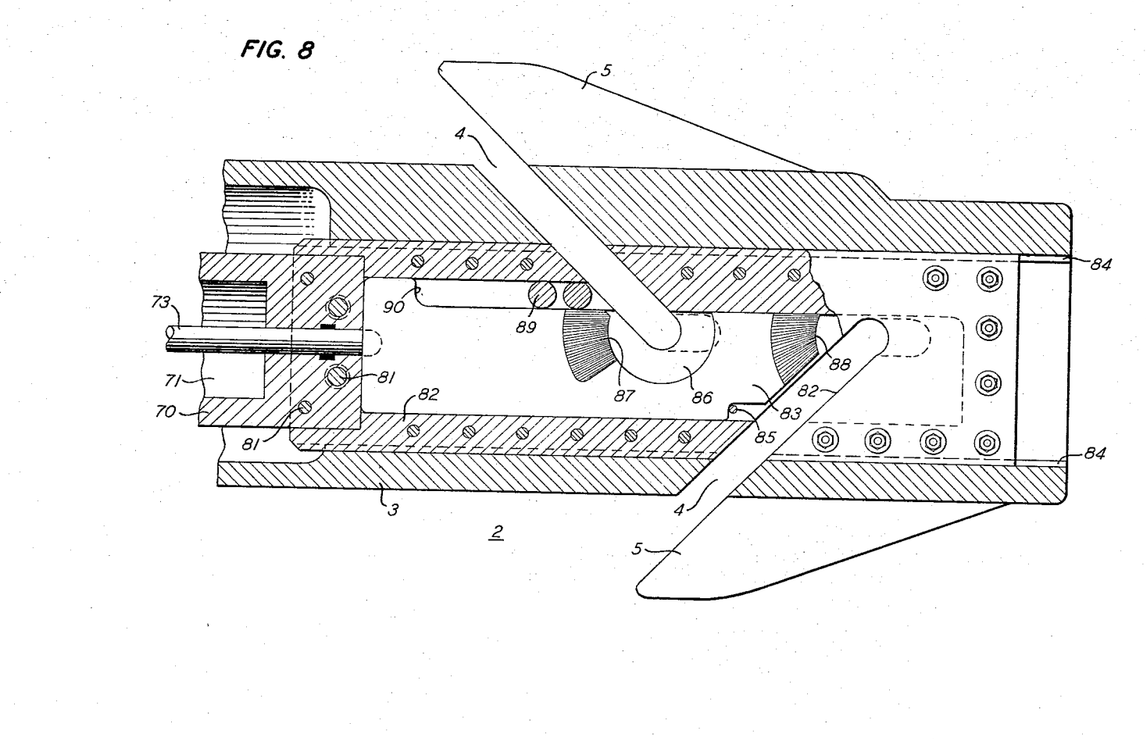
FIG. 8 is another view of the grapnel, mainly in section, taken from the same side as in FIG. 6 but showing the lower portion of the grapnel.

After the cable 1 has been engaged or caught by one of the flukes 5, the cable tensile load is applied to tension-responsive means inside the grapnel body 3. These means are shown in FIGS. 6 and 8 and are fully described hereinafter. When the applied tensile load reaches an assigned value, the tension-responsive means effect the release of the carriages 8 thereby allowing them to drop downward as is represented in FIG. 3. The grippers 6 are pivotally mounted on the carriages 8 in such a manner that gravity now causes them to rotate on the pins 9 in an outward direction so as to fall onto the opposite sides of the engaged portion of the cable 1 as is illustrated in FIG. 4.

When the grippers 6 thus fall onto the cable 1, their pivotally mounted guide plates 7 swing inward to permit the adjacent portions of the cable 1 to enter inside the grippers 6, as is indicated in FIG. 4. The internal construction of the grippers 6 is shown in detail in FIGS. 9 to 12, inclusive, and is fully described hereinafter. It is sufficient to state at this point that each of the grippers contains spring-loaded gripping jaws which function to hold the cable 1 securely.

A dome-shaped cap 12 is located at the top of the grapnel body 3 and projects upward above the protective hood 11. This cap 12 functions to ward off obstacles during dragging operations. It can be removed to provide access to the interior of the grapnel body 3 which contains the above-mentioned tension-responsive means that are adapted to be actuated by a varying load applied to the grapnel 2. In addition, the grapnel body 3 also houses a cable-cutting assembly which includes an explosive chamber, firing mechanism, and a double-edged cutter. These interior parts of the grapnel 2 are shown in FIGS. 6 and 8 and are discussed in detail hereinafter.

The top portion of the grapnel 2 is provided with two eye-bolts 13 each having an end of a chain 14 attached thereto. The other ends of the chains 14 are secured to another eye-bolt 15 which is fastened to one portion 16 of a two-part coupling device 17 having another section 18 which mates with the first portion 16. These mating parts 16 and 18, which are of male and female design respectively, are normally held together in their mated positions by means which include a pin that is adapted to shear in response to the application of a load in excess of an assigned amount.

The chains 14 are paralleled by two flexible wire ropes 19. The upper end of each wire rope 19 is fastened to a respectively different one of the sections 16 and 18 of the coupler 17. The ropes 19 are longer than the chains 14 because each rope 19 travels down through an associated one of two slots 20 in the hood 11 and has its lower end attached to an eye 21 formed at the bottom of a respectively associated cable gripper 6, as is shown in FIG. 4. The ropes 19 are of such lengths that, in the condition illustrated in FIG. 4, there is no tension applied to them. In this exemplary embodiment of the invention, the length of each of the chains 14 is 15 feet and the length of each of the wire ropes 19 is 23 feet. For convenience, the ropes 19 may be tied to the chains 14 by means of relatively weak cords 22.

Each of the mating parts 16 and 18 of the coupler 17 is provided with an eye-bolt 23 for holding an end of a respectively different one of two lengths of chain 24 which, for convenience, may be tied together with cords 25. As is shown in FIG. 2, the chains 24 extend upward and are fastened to rings 26. These rings 26 are also attached to the lower ends of two relatively long ropes 27 which are fabricated with a suitable material, such as polypropylene, in a manner such that they will not twist.

The upper ends of the ropes 27 are secured to a single ring 28 which is held in the lower end of a swivel 29. The upper end of the swivel 29 is fastened to the bottom end of a suitable grappling line 30 which extends upward to the deck of a cable-recovery ship. Thus, the wire ropes 19, chains 24, and ropes 27 constitute a composite hoist line which, in effect, is doubled on itself so that its middle portion is fastened to the grappling line 30.

It should be noted that the chains 24 are made relatively heavy so as to provide weight at the lower portions of the doubled hoist line. During grappling operations, the grappling line 30 and the attached, doubled hoist line form a long catenary extending from the cable-recovery ship to the grapnel 2 which is at the bottom of an ocean. During the time that the grapnel 2 is being dragged back and forth over the ocean floor, its upper portion should be in contact with the ocean floor in order for the flukes 5 to be in the best position for engaging or catching the cable 2. If the above-mentioned long catenary were light in weight, then the pulling tension might cause the front of the grapnel 2 to be raised above the ocean floor thereby placing the flukes 5 at a less desirable angle. However, the weight of the chains 24, when added to the weight of the chains 14, causes the lower portions of the doubled hoist line to be in contact with the ocean floor thus insuring that the grapnel 2 will be maintained in the desired position.

Although the lengths of the chains 14 and the ropes 19 remain unchanged for all grappling operations, the lengths of the chains 24 and the ropes 27 are not constant. Since grappling operations are performed in ocean depths which vary considerably, the length of the composite hoist line must vary correspondingly in order to insert the proper amount of slack into the cable 1. For example, in the case of one type of cable, it is calculated that the length of the hoist line should vary from 1,420 fathoms to 2,080 fathoms. Thus, the length of each half of the hoist line for this type of cable should vary from 4,260 feet to 6,240 feet.

It is convenient to meet these different requirements for length by varying the lengths of the chains 24 and the ropes 27 while maintaining constant the lengths of the chains 14 and the ropes 19. A practical method for doing this is to carry on the cable-retrieval ship three or four different fixed lengths of chains 24 and ropes 27. Then, when a grappling operation is to be performed, the ocean depth at that particular location is measured and the particular fixed lengths of chains 24 and ropes 27 that are best for use at this depth are selected. They are then connected to the ring 28 held in the swivel 29 at the end of the grappling line 30, and are also connected to the eyes 23 on the coupler 17.

A secondary reason for using these different lengths is that, since the length of the catenary formed by the grappling line 30 and the hoist line increases with the depth of the water, the length of the chains 24 should be correspondingly increased in order to hold or force the front of the grapnel 2 in contact with the ocean floor for the purpose of maintaining the flukes 5 in the best position for hooking or engaging the cable 1.

Before presenting a detailed description of the other specific components of the grappling equipment, the general grappling procedure will now be described. Assuming that the grappling line 30 has been attached to a composite hoist line having a length suitable for the depth of the water in which the grappling operations are to be performed, the first step in the grappling method is to lower the grapnel 2 to the ocean floor. Next, the grapnel 2 is dragged back and forth along the ocean floor in directions that are at right angles to the estimated axial direction of the cable 1. During this time, the weight of the chains 24 and 14 causes the front of the grapnel 2 to be held down in contact with the ocean floor so that the flukes 5 are in the best position for hooking the cable 1.

When the cable 1 is caught or engaged by one of the flukes 5, it is forced into the respectively associated slot 4 which guides it in toward the center of the body 3 of the grapnel 2 where it is held in the position shown in FIG. 1. Since the grappling line 30 and the composite hoist line continue to drag the grapnel 2, the engaged section of the cable 1 is pulled out of its position on the ocean floor and applies tension to the grapnel 2. This tension increases as this section of the cable 1 is pulled farther from its original position. The increased tension tends to straighten the catenary formed by the grappling line 30 and the composite hoist line with the result that the front end of the grapnel 2 is gradually lifted from the ocean floor and raised toward a vertical position.

When this increasing tension reaches an assigned value, it actuates tension-responsive means, located inside the body 3 of the grapnel 2 and described hereinafter, which release the carriages 8 on which the cable grippers 6 are mounted. Accordingly, the carriages 8 will now slide down the guides 10 in the grapnel body 3, in the manner shown in FIG. 3, thereby moving the cable grippers 6 out from under the hood 11 which shielded them during the dragging operations.

This permits the cable grippers 6 to rotate on the pins 9 in an outward direction toward the respectively adjacent portions of the cable 1, as is illustrated in FIG. 3. The grippers 6 thus fall onto the cable 1 and, since the slanted guide plates 7 are pivoted, the cable 1 is forced inside the grippers 6, as is represented in FIG. 4, where it is securely held by means described hereinafter. In this manner, the doubled composite hoist line is connected in parallel with the cable 1.

At a further increase in the tension applied by the cable 1, another assigned value is reached which causes the above-mentioned tension-responsive means inside the grapnel body 3 to actuate cutting means, described hereinafter, for severing that part of the cable 1 which is held in the slot 4. The severed ends of the cable 1 now pull apart from each other and the cable tensile load is immediately transferred from that portion of the grapnel body 3 defining the slot 4 to the cable grippers 6. Since this tensile load exceeds the load that can be carried by the pins 9, it forces the pins 9 to shear, as is indicated in FIG. 5, thereby freeing or disconnecting the grippers 6 from their associated carriages 8.

The cable tension now pulls the grippers 6 away from the grapnel 2. The wire ropes 19 are pulled out of their associated slots 20, thereby breaking the cords 22, and move away from the grapnel 2. The cable tensile load is now applied through the wire ropes 19 to the coupler 17 thereby causing its above-mentioned pin to shear, as is more fully explained hereinafter. The shearing of this pin actuates means which effect the separation of the two mating sections 16 and 18, as is illustrated in FIG. 5. This permits the chains 24 to spread apart, as is also shown in FIG. 5, thereby breaking the cords 25. It is to be noted that the grapnel 2 remains connected to only the mating section 16 of the coupler 17.

The result of this cutting of the cable 1 is that the composite hoist line is now, in effect, placed in series with the cable 1. This is illustrated in FIG. 5 which shows, in its lower left portion, one of the severed ends of the cable 1 securely held by one of the cable grippers 6. In the lower right part of FIG. 5, the other severed end of the cable 1 is represented as being retained by the other cable gripper 6. Thus, the doubled hoist line is connected in series between the severed ends of the cable 1.

This composite hoist line comprises the wire ropes 19, the chains 24, and the polypropylene ropes 27. Due to the considerable length of this hoist line, slack is introduced into the cable 1 so that the grappling line 30 can now be pulled up to the cable-recovery ship without unduly disturbing the main portions of the cable 1 that are on the ocean floor.

Thus, the grappling line 30 is pulled aboard the cable-recovery ship until its end carrying the swivel 29 appears on deck. At this point, the hoisting operations are stopped and one of the polypropylene ropes 27 is disconnected from the ring 28 at the end of the swivel 29. The disconnected rope 27, which may for convenience be the one to which the grapnel 2 is attached, is pulled up onto the deck together with its associated chain 24 and wire rope 19 so as to bring the associated severed end of the cable 1 aboard the ship. During this time, the ship moves in the direction of that portion of the cable 1 which is being pulled up and, at the same time, the other severed cable end is payed out while still being held by the hoist line and the grappling line 30. This minimizes disturbance of those portions of the cable 1 which remain on the ocean floor.

The severed cable end which has been pulled onto the deck is now spliced to an end of a new cable section. Next, this splice is overboarded and the new cable section is payed out into the water while the ship reverses its direction in order to simultaneously pull up the other severed cable end. When this second severed cable end is hauled aboard, it is spliced to the other end of the new cable section. This second splice is then overboarded and the adjacent portion of the cable 1 is now returned to the ocean floor either by being simply dropped down or by being lowered down with suitable lowering means. In this manner, the cable 1 can be retrieved, repaired, and returned to the ocean floor with a minimum disturbance of the main portions of the cable 1.

Figures 6, 7:
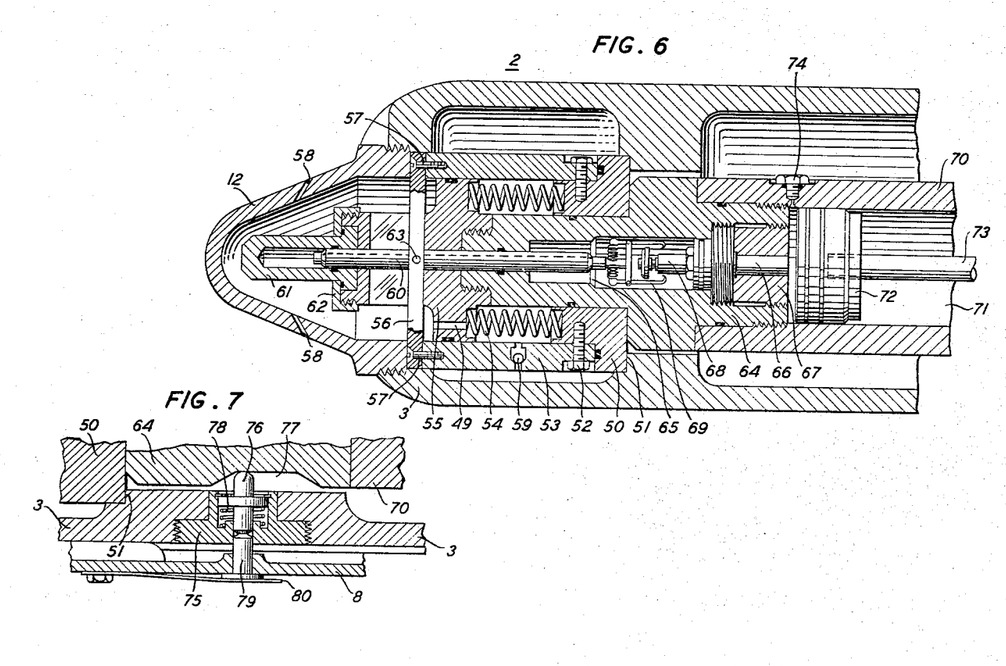
FIG. 6 is a sectional side view of the upper portion of the grapnel.
FIG. 7 is a fragmentary cross-sectional front view taken along the middle portion of that part of the grapnel shown in FIG. 6 after it has been turned ninety degrees about its vertical axis and showing a small portion of one of the cable gripper assemblies.

The internal construction of the grapnel 2 is illustrated in FIGS. 6 and 8 with the upper portion of the grapnel 2 being shown in FIG. 6 and the lower portion being shown in FIG. 8. As is represented in FIG. 6, the top of the body 3 of the grapnel 2 is threaded for receiving the dome-shaped cap 12. Inside the body 3, a supporting ring 50 rests upon a shoulder 51 formed in the interior wall of the body member 3. This ring 50 is fixedly attached by bolts 52 to a cylindrical member 53. The ring 50 provides a supporting base for the bottom ends of tension-responsive means constituted by a plurality of compression springs 54 circularly disposed within the cylinder 53.

The tops of the springs 54 abut against a cover member 55 which extends upward into the cap 12 by passing through a central hole in an annular brace 56 which is attached by screws 57 to the cylindrical member 53. It should be noted that the cap 12 has holes 58 for permitting the entrance of sea water which flows down inside the body 3 and through a check valve 59 into the area of the springs 54. When the cover member 55 moves downward, thereby compressing the springs 54, sea water is forced out of the area of the springs 54 through an orifice 49. This provides a dashpot effect for dampening any motion of the springs 54 that might tend to be caused by suddenly applied loads.

The central portion of the cover member 55 has a vertical bore for accommodating a rod 60 which projects upward therefrom. The projecting portion of the rod 60 is enclosed within a tip member 61 which is secured to the cover member 55 by means of a threaded ring 62. The rod 60 is held from movement by means of a screw 63 passing through the annular brace 56. The brace 56 cannot move because its upper surface abuts against the bottom of the dome-shaped cap 12 and its lower surface rests on the top of the cylindrical member 53 which is attached by the bolts 52 to the supporting ring 50. However, the cover member 55 and the tip member 61 can move up and down on the springs 54. In so doing, the cover member 55 and the tip member 61 slide up and down on the fixedly held rod 60.

The cover member 55 has a central threaded portion which is secured to an internal core member 64 having a central bore for slideably accommodating the rod 60. The lower part of this bore is progressively enlarged in three stages. At the boundary between the upper and middle stages of enlargement, a shoulder 65 is formed for performing a function described hereinafter. The lower stage of enlargement contains an explosive cartridge 66 mounted in a cartridge chamber 67.

The firing mechanism for the cartridge 66 is located in the above-mentioned middle stage of enlargement and includes a firing pin 68 having an enlarged head. This head is surrounded by a plurality of spring-biased fingers 69 which are pivotally attached to the bottom end of the rod 60 and which function as a tripper mechanism for operating the firing pin 68.

The lower portion of the core member 64 is threaded for receiving thereon a hollow cylindrical member 70 which forms an explosive chamber 71 containing a piston 72 mounted on a piston rod 73.

During grappling operations, a cable 1 will be engaged by the grapnel 2. The tension exerted by this engaged cable will, in a manner explained hereinafter, cause the assembly including the cylindrical member 70, piston 72, piston rod 73, core member 64, firing pin 68, and cover member 55 to move downward in opposition to the resilient force exerted by the springs 54. During this time, the rod 60 is held from movement as was stated above.

When the firing pin 68 thus moves downward, its enlarged head is caught by the inwardly curving fingers 69 which are held from downward movement by reason of being attached to the rod 60. Further movement of the firing pin 68, causes its head to be drawn out against a force exerted by an interior compression spring. This act of pulling out the head of the firing pin 68 serves to cock the firing mechanism thereby arming the cutting mechanism which is described in detail hereinafter.

Continued downward movement of the core member 64 brings its shoulder 65 into engagement with the ball-shaped tops of the fingers 69. These tops of the fingers 69 are normally pushed away from the rod 60 by a plurality of associated biasing springs. The shoulder 65 is curved for the purpose of exerting, during its downward movement, a camming action which forces the tops of the fingers 69 inward toward the rod 60. This action is accompanied by the outward movement of the bottoms of the fingers 69. This releases the head of the firing pin 68 which is snapped back by its associated interior compression spring thus firing the cartridge 66.

The resulting explosion drives the piston 72 and its piston rod 73 downward for actuating the cutting mechanism and causing it to sever the cable 1 in a manner explained hereinafter. Subsequently, after the grapnel 2 has been retrieved, any residual pressure from this explosion can be relieved by opening a vent plug 74 in the wall of the cylindrical member 70.

This upper portion of the body 3 of the grapnel 2 is provided with retaining means on opposite sides thereof for detachably holding the cable grippers 6 and their carriages 8 in their normally upright positions that are shown in FIG. 1. The retaining means on one side of the body 3 are illustrated in FIG. 7 which, as was stated above, is a fragmentary cross-sectional front view taken along the middle part of that portion of the grapnel 2 shown in FIG. 6 after it has been turned ninety degrees about its vertical axis. FIG. 7 also shows a small portion of one of the cable gripper carriages 8. In FIG. 7, it can be seen that the grapnel body 3 is provided with a small hole fitted with an insert 75 having a central cylindrical cavity containing a flanged pin 76. The left end of the pin 76 is slideably inserted part of the way into a small central bore in the insert 75. The right end of the pin 76 is shown to be projecting into a small cavity 77 in the core member 64.

The pin 76 is normally held in this position by the biasing force exerted by a surrounding coiled compression spring 78. As is shown in FIG. 7, the spring 78 has one end abutting against the insert 75 and its other end abutting against the flange on the pin 76. It should be noted that the upper portion of the cavity 77 is curved so as to provide a camming surface for subsequently acting on the pin 76. A similar insert, pin, and spring are mounted on the opposite side of the grapnel body 3 for use with the other gripper carriage 8.

The gripper carriage 8 that is partly shown in FIG. 7 is provided with a latch pin 79 of approximately the same diameter as the pin 76. The latch pin 79 is slidably inserted through a small hole in the carriage 8 and has its left end attached to an end of a leaf spring 80. The other end of the spring 80 is secured to the inside wall of the carriage 8. This spring is so designed as to tend to push the pin 79 toward the right in FIG. 7 so that it can function in the manner of a latch. The other gripper carriage 8 is provided with a similar pin and leaf spring.

In order to hold the cable grippers 6 and their carriages 8 in their normally upright positions that are shown in FIG. 1, they are manually pushed upward until their pins 79 become aligned with the central bores in the inserts 75. When this alignment occurs, the leaf springs 80 push the latch pins 79 into the bores to such an extent that the pins 79 abut against their respectively associated pins 76. The pins 79 now support their associated carriages 8 in their elevated vertical positions. While in these positions, the carriages 8 are prevented from tipping forward by the downward extending edges of the hood 11.

When the core member 64 begins its above-described downward movement, the curved upper surfaces of the cavities 77 perform a camming action on the pins 76. This camming action forces the pins 76 to compress their biasing springs 78 and to slide toward the entrances of the bores in the inserts 75. In so moving, the pins 76 push their respectively associated latch pins 79 back against their springs 80 and out of the bores in the inserts 75. This releases the carriages 8 which, with their associated cable grippers 6, now drop downward as is represented in FIG. 3.

In FIG. 8, it can be seen that the lower portion of the cylindrical member 70 is secured by screws 81 to a frame member 82 which holds cutting means constituted by a guillotine blade 83 having two cutting edges 87 and 88. The frame member 82 together with the cutter 83 are adapted to slide up and down along a path defined by vertical guides 84. This sliding movement is transmitted to the cylindrical member 70 for ultimately producing an effect upon the springs 54 shown in FIG. 6.

In addition to this sliding movement, the cutting blade 83 is adapted to slide independently within the frame member 82 without affecting movement of the frame member 82. This independent movement of the blade 83 is effected by the piston rod 73 which has its lower end inserted into a small socket in the top of the cutting blade 83, as is indicated in dotted lines in FIG. 8. Normally, a pin 85 holds the blade 83 and prevents it from moving independently of the frame member 82. The pin 85 is designed to be subsequently sheared by the blade 83 in response to the impact produced by the piston rod 73 when it is driven by the firing of the cartridge 66.

The cutting blade 83 is provided with a hole 86 surmounted by a sharp cutting edge 87. This hole 86 is so located as to be aligned with the bottom portion of the upper slot 4 that is formed in the grapnel body 3 and the frame member 82. It should be noted that the lower portion of the hole 86 extends slightly below this slot 4 so that, when the cable initially enters this slot 4, the weight of the cable 1 will not be supported by the cutting blade 83. The cutting blade 83 is also provided with another sharp cutting edge 88 at its lower end which is located above the lower slot 4. Thus, if the cable 1 enters this lower slot 4, its weight will be initially supported by the frame member 82.

To insure that the weight of the cable 1 will be initially supported entirely by the frame member 82 and not by the grapnel body 3, the bottom portion of each slot 4 extends downward for a greater distance in the body 3 than it does in the frame member 82. This greater depth of each slot 4 in the body 3 is indicated in FIG. 8 by the broken lines at the foot of each slot 4. In other words, the foot of each slot 4 in the frame member 82 is shown in full lines while the foot of each slot 4 in the body 3 is represented in broken lines. Therefore, regardless of which one of the flukes 5 initially engages the cable 1, the cable 1 will slide down the respectively associated slot 4 and will be supported entirely by the frame member 82.

The force of the tension thus exerted by the cable 1 upon the frame member 82 will be applied through the cylindrical member 70 and its associated elements to the springs 54. When the cable tensile load increases, it forces the frame member 82 and the assembly of its associated elements to move downward thereby compressing the springs 54. The downward movement of this assembly produces three actions.

The first action to occur is the release of the gripper carriages 8. This is accomplished by producing a camming action, described above, which causes the pins 76 to push the latch pins 79 out of the holes in the inserts 75. This allows the carriages 8 and their associated cable grippers 6 to drop downward below the confines of the hood 11. The grippers 6 then rotate on the pins 9 in an outward direction, as is shown in FIG. 3, and fall upon the adjacent portions of the cable 1 which become securely held thereby as is indicated in FIG. 4. Since the ends of the above-described composite hoist line are secured to the grippers 6, this action causes the composite hoist line to be connected in parallel with the cable 1.

Further downward movement of the cutter frame member 82 produces the second action. The result of this second action is that the firing pin 68 is pulled upward by the fingers 69 for the purpose of cocking the firing mechanism and thus arming the cutting mechanism as was explained above.

As the frame member 82 continues to move downward, the third action is accomplished. This action causes the firing pin 68 to be released in the manner described above. The resulting explosion of the cartridge 66 causes the piston rod 73 to drive the cutting blade 83 downward within its associated frame member 82. Accordingly, if the cable 1 is in the upper slot 4, it will be severed by the upper cutting edge 87. Similarly, if the cable 1 should be in the lower slot 4, it would be severed by the lower cutting edge 88.

It should be noted that two pins 89 are mounted along the side of the cutter blade 83 and below a shoulder 90 thereof. The distance between the shoulder 90 and the top pin 89 is approximately equal to the distance between the front of one of the cutting edges 87 and 88 and the bottom surface of a cable held in one of the respectively associated slots 4. Thus, during ordinary cutting operations, the pins 89 do not affect the operation of the cutting blade 83. However, if the cartridge 66 should be accidentally fired without a cable being in either of the slots 4, the shoulder 90 would strike the pins 89 and would shear them. The energy required to shear the pins 89 would dissipate the force exerted by the cutting blade 83 so that it would not damage the bottom of the frame member 82.

When the cable 1 is severed after the occurrence of the three actions described above, the cable tensile load is transferred from the frame member 82 to the cable grippers 6 which are consequently pulled away from their carriages 8. This applies the cable tensile load to the wire ropes 19 thereby causing the mating sections 16 and 18 of the coupler 17 to become separated. The equipment is thus placed in the condition illustrated in FIG. 5 with the composite hoist line now, in effect, connected in series with the cable 1.

Figure 9:
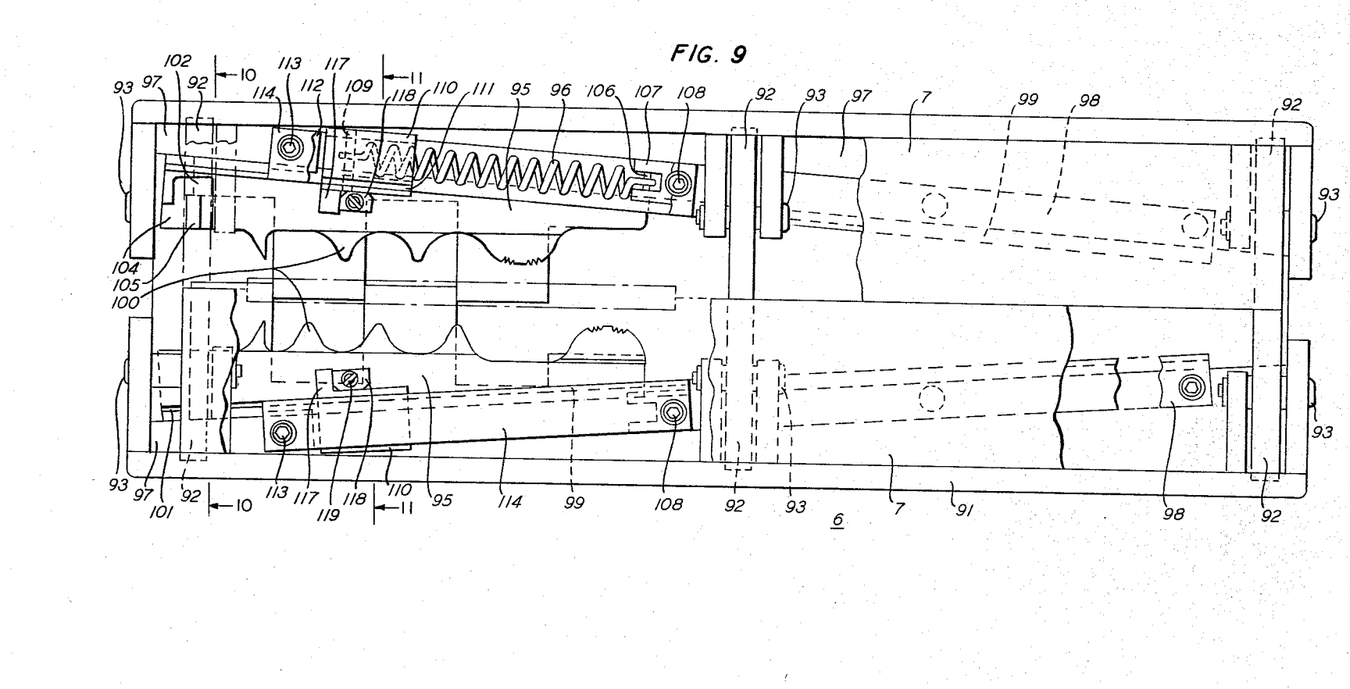
FIG. 9 is a front view, chiefly in section, of one of the cable grippers shown in its unoperated condition.
Figure 10:
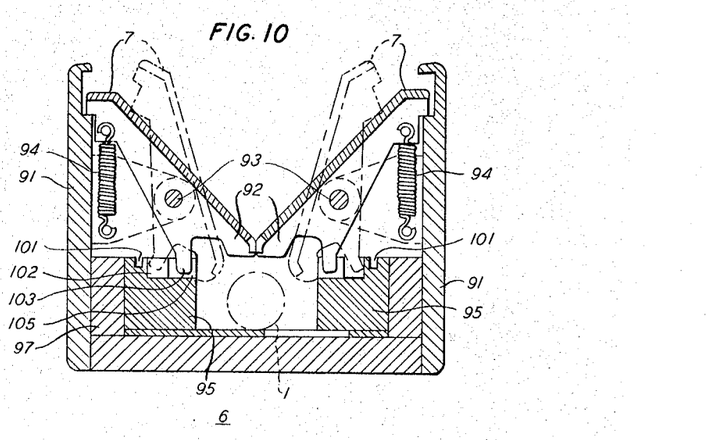
FIG. 10 is a sectional end view of the cable gripper taken along the line 10—10 in FIG. 9 with the operated positions of some of the elements shown in phantom.
Figure 11:
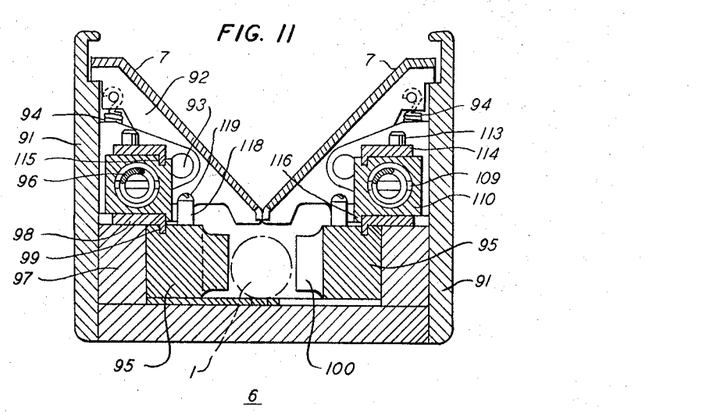
FIG. 11 is a sectional end view of the cable gripper taken along the line 11—11 in FIG. 9.

The internal construction of the cable grippers 6 is shown in detail in FIGS. 9 to 12, inclusive, and will now be described. In FIG. 9, one of the grippers 6 is represented in its unoperated condition and is shown to comprise a housing 91 shaped like a rectangular box for containing the various elements. The front of the housing 91 is normally covered by two guide plates 7. Each guide plate 7 is mounted on three rotatable brackets 92 at a 45 degree angle as is illustrated in FIGS. 10 and 11. The housing 91 and the guide plates 7 are sturdily constructed of metal. In this embodiment of the invention, each gripper 6 weighs approximately 150 pounds.

It can be seen in FIG. 10 that the rotatable brackets 92 are mounted on pivots 93 and are normally biased in their closed positions by springs 94. When a cable 1 is engaged by the grapnel 2, the grippers 6 fall upon the respectively adjacent portions of the cable 1 whereby the guide plates 7 are forced inward to their open positions indicated in broken lines in FIG. 10. The cable 1 thus enters the grippers 6 and assumes a position along the bottom thereof as is also indicated by broken lines in FIG. 10. After the cable 1 has taken this position, the springs 94 pull the guide plates 7 back to their normal or closed positions.

When the cable 1 enters the grippers 6, it is clamped between oppositely disposed jaws 95 having teeth or serrations 100 for gripping the cable 1. In order to securely hold the cable 1, the jaws are adapted to slide along a V-shaped path in response to force initially exerted by springs 96. This V-shaped path is defined by blocks 97 which may be fabricated integrally with the bottom of the housing 91 in such a manner that each block 97 has a progressively increasing width. The direction in which this width increases is from the left to the right in FIGS. 9 and 12. Each of the blocks 97 has fixedly mounted on the top thereof a guide bar 98 having a flange 99. Each flange 99 is adapted to fit into a longitudinal slot or groove 101 in the top of its respectively associated jaw 95. Thus, these flanges 99 serve as guide rails for guiding the sliding movement of the jaws 95 along paths which tend to converge at the right in FIGS. 9 and 12.

Figure 12:
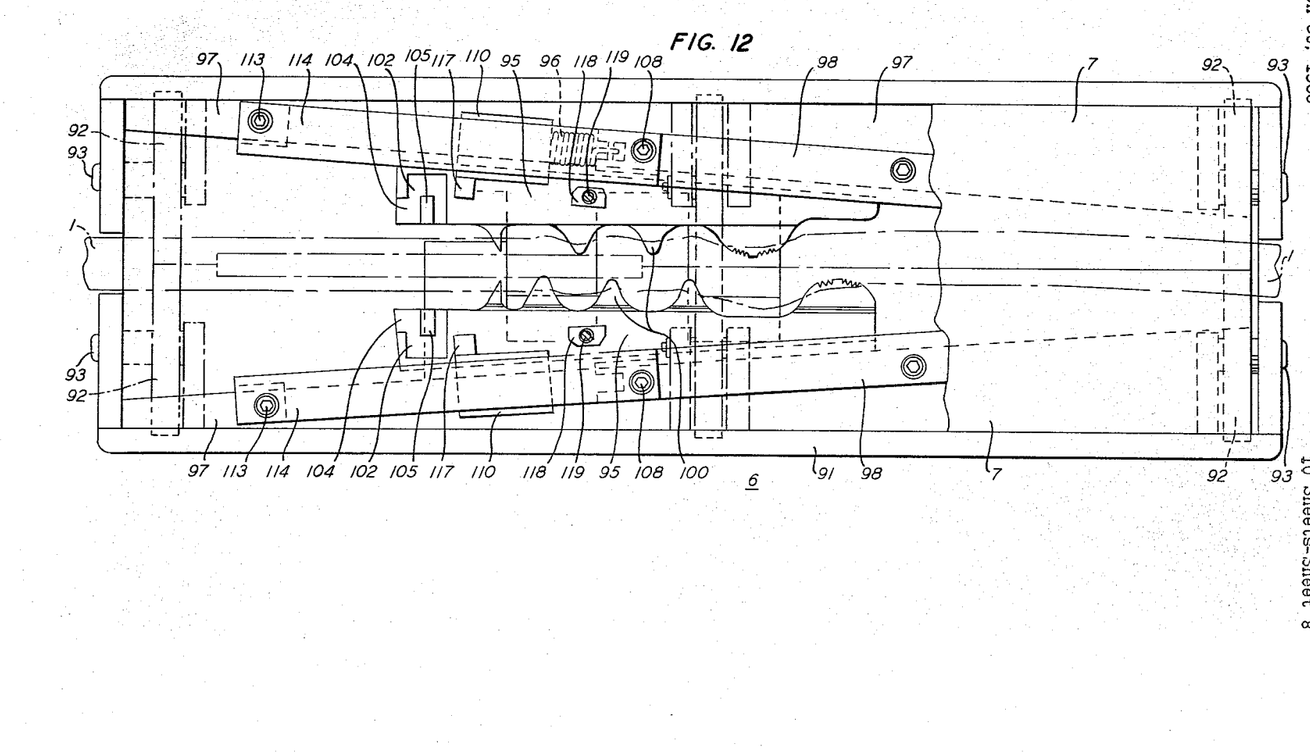
FIG. 12 is a front view, partly in section, of the cable gripper shown in its operated condition with a portion of a cable held therein.

It should be noted that the left end of the gripper 6, as viewed in FIGS. 9 and 12, faces that portion of the cable 1 where the cut will occur, whereas the right end of the gripper 6 faces the portion of the cable 1 that extends outward on the ocean floor. Therefore, when the cable 1 is raised from the ocean floor by the grapnel 2, the jaws 95, which are initially moved to the right by the springs 96, will be pulled further to the right by the tension exerted by the cable 1.

In preparing the gripper 6 for subsequently receiving the cable 1, the slidable jaws 95 are manually pulled toward the left from the position shown in FIG. 12 to assume the position shown in FIG. 9. The left end of each jaw 95 has a U-shaped slot 102 formed therein for receiving an arm 103 on the bottom of the respectively associated bracket 92. The left end of each slot 102 is open, as is indicated by the reference numeral 104, for receiving therein the associated arm 103. After each arm 103 enters its associated slot 102, it is moved upward to the base of the slot 102, around a post 105, and then down into the right leg of the slot 102 thereby assuming the position represented in FIG. 10. Thus, the arms 103 on the brackets 92 function to hold the jaws 95 in positions ready for admitting the cable 1 between them.

Each of the springs 96 has its right end held by a bolt 106 which passes through a clevis 107 that is fixedly attached to the respectively associated guide bar 98 by a bolt 108. Each spring 96 has its other end held by a bolt 109 that is secured to a sliding block 110 having a slot or groove 111 in its upper surface as is indicated in FIG. 9. As is also indicated in FIG. 9, a spacing block 112 is located at the left of each of the sliding blocks 110 and is secured to the respectively associated guide bar 98 by a bolt 113.

Each spacing block 112 and each clevis 107 supports one end of a pair of guide bars 114 which are secured thereto in positions directly above the springs 96 by means of the bolts 108 and 113. One edge of each guide bar 114 is provided with a flange 115 which fits into the slot 111 in the respectively associated block 110 as is represented in FIG. 11. These flanges 115 function as rails for guiding the sliding movement of the blocks 110. Each block 110 is provided with additional guide means in the form of a flange 116 along a lower edge thereof for abutting against the edge of its associated lower guide bar 98. Thus, each block 110 is adapted to slide back and forth between its associated upper guide bar 114 and its associated lower guide bar 98.

It should be noted that each of the sliding blocks 110 is provided at one corner thereof with a projection 117 which is adapted to engage a respectively associated small block 118. Each of these blocks 118 is mounted on a respectively different one of the jaws 95 and is attached thereto by an associated screw 119.

The function of the projections 117 and the blocks 118 is to transmit the tensile force from the springs 96 to the jaws 95. The manner in which this is accomplished will now be described.

With the equipment in a state of rest and before the grippers 6 are initially prepared for receiving a cable, the jaws 95 are in the positions shown in FIG. 12 and the springs 96 are in their released positions. Under this condition, there is an appreciable separation between the small blocks 118 and the projections 117 on the sliding blocks 110 as is evident from inspection of FIG. 12.

In preparing the grippers 6 for receiving a cable, the jaws 95 are manually pulled to the left, as was explained above. When the jaws 95 now move to the left, they carry with them the small blocks 118. At a certain point in this movement, the blocks 118 engage the associated projections 117 on the sliding blocks 110. Continued leftward movement of the jaws 95 forces the blocks 110 to slide toward the left between the upper and lower guide bars 114 and 98. Since the left ends of the springs 96 are attached by the bolts 109 to the blocks 110, this leftward movement of the blocks 110 causes the springs 96 to become stretched.

Finally, the jaws 95 become locked in their extreme leftward position, shown in FIG. 9, by the engagement of the arms 103 with the right legs of the associated U-shaped slots 102, as was described above. At this time, the springs 96 are in their extreme extended, or stretched, condition. In other words, the pulling of the jaws 95 to the left serves to cock the springs 96. It is to be noted that, in this condition, the tension produced by stretching the springs 96 is applied through the projections 117 to the small blocks 118 in readiness for causing the jaws 95 to seize a cable.

Now, when the cable 1 is engaged by the grapnel 2, the grippers 6 fall upon the respectively adjacent portions of the cable 1 thereby forcing the cable 1 inside the grippers 6 as is indicated in FIG. 12. When the cable 1 thus moves inside the grippers 6, it forces the guide plates 7 to move from their positions shown in solid lines in FIG. 10 to the positions indicated in broken lines. The movement of the guide plates 7 causes their brackets 92 to rotate about their pivots 93 thereby swinging the bracket arms 103 backward to he bases of their respectively associated U-shaped slots 102. This permits the springs 96 to pull the jaws 95 a short distance toward the right until the bracket arms 103 abut against the bases of their associated left legs of the slots 102.

After the cable 1 has moved inside the grippers 6, the short springs 94 function to pull the guide plates 7 back to their normal or closed positions shown in solid lines in FIG. 10. The brackets 92 follow the guide plates 7 by rotating back about their pivots 93 thus pulling the bracket arms 103 forward to the open ends of their associated slots 102. This serves to release the jaws 95 because, when they now move toward the right, their slots 102 will move completely out of engagement with the arms 103.

Accordingly, the tension exerted by the springs 96 can now be freely transmitted through the projections 117 to the small blocks 118 which are secured to the jaws 95. This forces the jaws 95 to slide quickly toward the right along the V-shaped path defined by the blocks 97. The resulting converging movement of the jaws 95 causes them to seize the cable 1 with their teeth 100. It should be noted that the first tooth 100 at the left end of each jaw 95 is longer and sharper than the other teeth 100 for the purpose of providing an initial bite upon the cable 1. The other teeth 100 are so spaced and disposed as to tend to interlock rather than to meet, thus bending the cable 1 as is indicated in broken lines in FIG. 12.

In this manner, the cable 1 is securely gripped and held by the jaws 95. The cable tension is applied to the jaws 95 in a direction which tends to pull the jaws 95 together and thus tighten their grip upon the cable 1. This is particularly the case when the cable 1 becomes severed because it should be understood that the two grippers 6 have the wide ends of their V-shaped paths, defined by the blocks 97, facing each other. In other words, the internal components of the gripper 6, shown in FIGS. 9 and 12, are oppositely disposed with respect to those of the other gripper 6. When these grippers 6 are applied to the cable 1, as is represented in FIG. 4, there is a short portion of the cable 1 extending between them and this is where the severance occurs.

After the cable 1 has been cut, the severed ends are retained by their respectively associated grippers 6, as is represented in FIG. 5. The doubled hoist line is thus connected in series with the cable 1 for the purpose of introducing slack as was described above. Accordingly, this assembly is now brought up to the cable-recovery ship by pulling up the grappling line 30, as was also described above.

It was explained above, in connection with the description of the equipment shown in FIG. 1, that the composite hoist line includes two parallel lengths of chain 24 having their lower ends attached to eye-bolts 23 which are secured to the mating sections 16 and 18 of a coupler 17. It was also explained above that the sections 16 and 18 are normally held together in their mated positions by means which include a pin that is adapted to shear in response to the application of a load in excess of an assigned amount thereby permitting the portions 16 and 18 to separate, as is represented in FIG. 5.

The composite hoist line further comprises a pair of flexible wire ropes 19 each having one end secured to a respectively different one of the mating sections 16 and 18. The other end of each of the wire ropes 19 is attached to a respectively different one of the grippers 6. The wire ropes 19 are paralleled to a certain extent by the chains 14 which have their lower ends secured to the grapnel 2 while their upper ends are fastened to the eye-bolt 15 that is attached to the section 16.

With the grappling equipment in the condition shown in FIG. 1, there is no appreciable tension on either of the flexible wire ropes 19 which simply hang from the sections 16 and 18. All the weight of the grapnel 2 is supported by the chains 14. In additional, the cable tension is transmitted from the grapnel 2, up through the chains 14, and then through the coupling device 17 to the parallel chains 24.

After the cable 1 has been cut by the guillotine blade 83, it is desirable that the coupler's mating sections 16 and 18 become disconnected from each other so that the lower portions of the two lengths of chain 24 can move apart as is represented in FIG. 5. Since the cutting of the cable 1 does not increase the total weight or tension applied to the coupler 17, the disconnection of its mating sections 16 and 18 should be accomplished by employing control means which will be actuated in response to the severance of the cable 1. Such control means are illustrated in FIGS. 13, 14, and 15 and will now be described.

Figure 13:
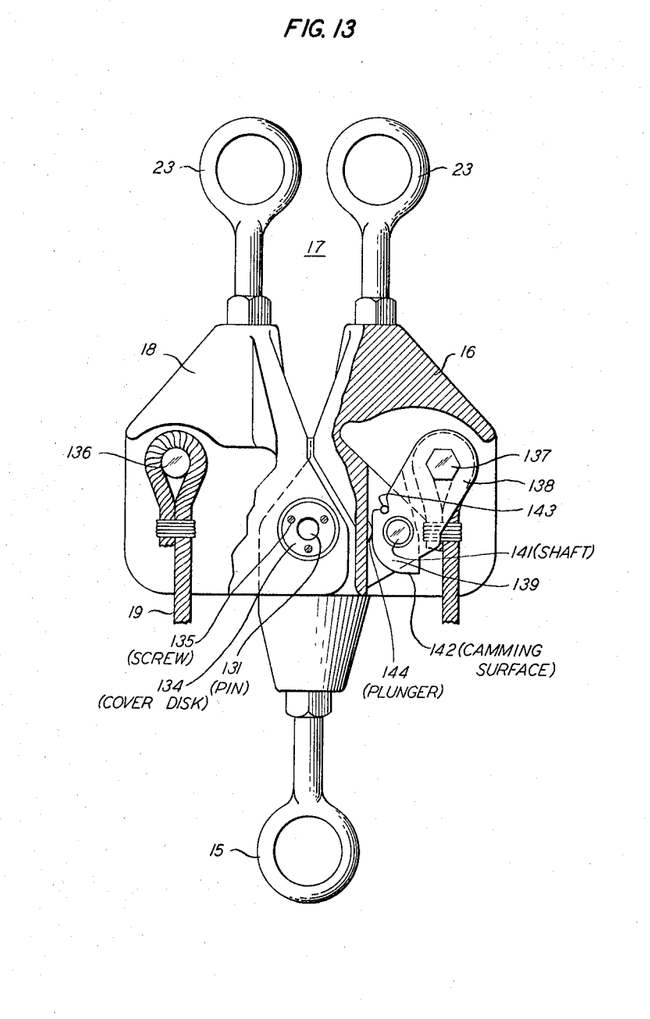
FIG. 13 is a front view, partly in section, of the coupling device for connecting the grapnel to the composite hoist line.
Figure 14:
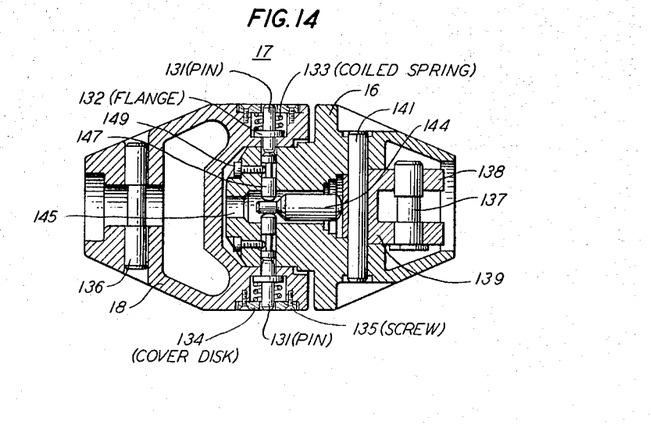
FIG. 14 is a cross-sectional plan view of the coupling device showing its two main parts held together in their mated condition.
Figure 15:
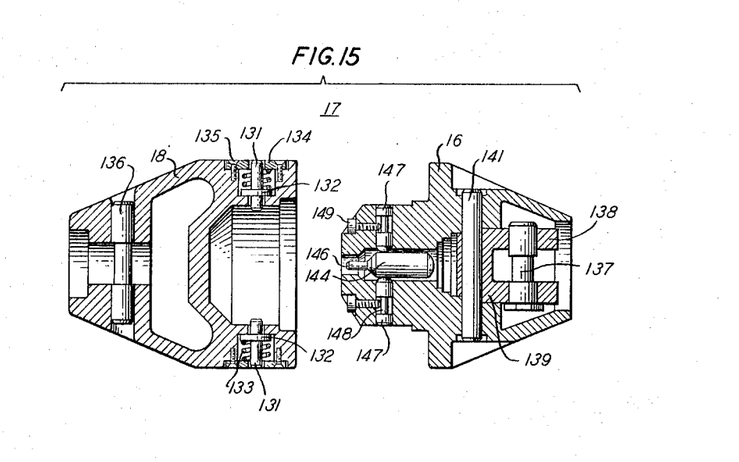
FIG. 15 is a similar sectional plan view of the coupling device but showing its two main parts in their separated condition.

In FIGS. 13, 14, and 15, it can be seen that the coupling device 17 comprises a male section 16 which is designed to mate with a female section 18. The sections 16 and 18 are normally held together in their mated condition by two pins 131 which fit into holes in the female section 18 and also into similar holes in the male section 16. To facilitate this holding or locking function, the holes in the male section 16 are so located as to become aligned with the holes in the female section 18 when the two sections 16 and 18 are manually placed in their mating positions.

It can be seen that an intermediate portion of each pin 131 is provided with a flange 132. In order to permit the insertion of this flange 132 into the holes in the female section 18, these holes are enlarged for a portion of their lengths as is represented in FIGS. 14 and 15. Each pin 131 is surrounded by a coiled spring 133 having one end abutting against the respectively associated flange 132. Each spring 133 has its other end restrained by a cover disk 134 which fits into a recessed portion of the female section 18 where it is held by screws 135.

Since the springs 133 are compressed, they push against the associated flanges 132 and thereby force the pins 131 inward until their flanges 132 abut against the bottoms of the enlarged portions of the holes in the female sections 18. This action serves to force an end of each pin 131 into the holes in the male section 16 thus locking together the sections 16 and 18. It should be noted that the pins 131 have sufficient strength to support the weight of the grapnel 2 and its engaged portion of the cable 1.

The female section 18 is made with a U-shaped portion for supporting a pin 136 which holds the upper end of the left wire rope 19. As was explained above, the lower ends of the wire ropes 19 are attached to the grippers 6. The upper end of the right wire rope 19 is fastened to another pin or bolt 137 which passes through a clevis 138 in the male section 16. This clevis 138 is formed at the upper end of a member 139 that is pivotally mounted on a shaft 141 which is supported inside the male section 16. The lower portion of the member 139 is so shaped as to provide a camming surface 142 as is best seen in FIG. 13.

The member 139 is normally held in the position shown in FIG. 13 because its lower portion is provided with a groove or notch which abuts against a shear pin 143. This pin 143 is designed to hold the member 139 when it is bearing a light load but the pin 143 is also designed to break or shear when a heavy load is applied to the member 139. The only load normally applied to the member 139 is the load caused by the weight of the wire rope 19 which is fastened to the bolt 137. This wire rope 19 ordinarily has no tension applied to it and simply hangs from the bolt 137. The shear pin 143 is designed to withstand this load caused by the wire rope 19 and therefore functions to maintain the connection of the mating sections 16 and 18.

As was explained above, the weight of the grapnel 2 is supported by the chains 14 which are attached to the eye-bolt 15. The eye-bolt 15 is, in turn, secured to the male section 16. Normally, the grapnel 2 carries the two cable grippers 6 so that their weight is not applied at this time to either of the wire ropes 19.

It was stated above that, since the cutting of the cable 1 does not increase the total weight or tension applied to the coupler 17, the disconnection of its mating sections 16 and 18 should be effected in response to the severance of the cable 1. Accordingly, this is accomplished by providing a plunger 144 for coaction with the camming surface 142 of the member 139. The plunger 144 is adapted to move in a cavity 145 formed in the male section 16. As is shown in FIGS. 14 and 15, one end of the plunger 144 has a reduced diameter for forming a narrow tip 146 which is joined by a sloping portion to the main body of the plunger 144.

Normally, the tip 146 of the plunger 144 is in such a position that it lies between extensions of the holes which accommodate the flanged pins 131, as is represented in FIG. 14. Each extension of these holes contains a pin 147 having a middle portion 148 of reduced diameter. One end of each of the pins 147 abuts against an end of a respectively associated one of the flanged pins 131. The pins 147 have sufficient lengths for their other ends to abut against opposite sides of the tip 146 of the plunger 144. Normally, the coiled springs 133 force the flanged pins 131 to push the pins 147 into contact with the tip 146 of the plunger 144.

Two screws 149 are inserted in the body of the male section 16 in a transverse direction with respect to the pins 147 and are disposed in such a manner that each of their tips is opposite the middle portion 148 of a respectively different one of the pins 147. The screws 149 do not press against the pins 147. Instead, the screws 149 do not quite touch the middle portions 148 so as to function as stops for limiting the extent of the sliding motion of the pins 147. In other words, the sliding motion of the pins 147 in either direction is limited by the engagement of their enlarged end sections with the tips of the screws 149.

When the cable 1 is engaged by the grapnel 2, the grippers 6 slide down and then swing outward to grip the cable 1 as is illustrated in FIGS. 3 and 4. Subsequently, the guillotine blade 83 is actuated for cutting the cable 1. The severance of the cable 1 causes the cable tensile load to be released from the frame member 82 in the body 3 of the grapnel 2. The cable tensile load is now transferred to the grippers 6 thereby forcing the pins 9 to shear and thus detaching the grippers 6 from their carriages 8. This applies the weight of the grippers 6 and the cable tensile load to the wire ropes 19.

Although the load which is thus placed on the wire ropes 19 is divided between them, the portion of the load that is now carried by the right wire rope 19 exceeds the amount which the pin 143 is designed to withstand. Accordingly, the pin 143 is now sheared thus permitting the member 139 to rotate about its shaft 141. This rotation of the member 139 is in such a direction that its upper end is pulled downward by the respectively associated wire rope 19. The camming surface 142 on the lower portion of the member 139 now moves upward and performs a camming action on the plunger 144.

This camming action causes the plunger 144 to slide along the cavity 145 in such a direction as to move its tip 146 toward the female section 18. When the tip 146 moves in this direction, the adjacent sloping portion of the plunger 144 is forced between the pins 147. The pins 147, in turn, force their abutting pins 131 to move outward thereby compressing the associated coiled springs 133. The pins 131 will now project or protrude a short distance beyond the surface of their surrounding cover disks 134.

Continuation of the camming action forces the main body of the plunger 144 between the pins 147. This causes the pins 147 to move to their positions shown in FIG. 15 wherein the tips of the associated screws 149 engage the inner enlarged end sections of the pins 147. This additional movement of the pins 147 produces a corresponding additional movement of the outer pins 131 which carries them completely out of the male section 16. At this point, the pins 131 cease to hold the sections 16 and 18 together and they are now free to separate.

The separation of the sections 16 and 18 is quickly effected because the wire ropes 19 are not parallel but extend from the coupler 17 downward at a diverging angle to the grippers 6. Accordingly, the sections 16 and 18 become separated so that the equipment now assumes the condition shown in FIG. 5. As can be seen in the drawing and as was explained above, when the sections 16 and 18 separate, the grapnel 2 remains connected to the section 16 by means of the chains 14 which are fastened to the eye-bolt 15. The process of retrieving the cable 1 can now proceed in the manner described above.

What is claimed is:

1. Equipment for retrieving a cable lying at the bottom of a body of water,
    said equipment including a grapnel comprising a body having at its upper portion a protective hood with oppositely disposed portions thereof projecting outwardly on opposite sides of said body,
    said body having at its lower portion at least two flukes each adapted for catching a cable,
    said flukes being disposed on opposite sides of said body that are different from the sides on which said hood projects,
    said body having at its intermediate portion two grippers slidably mounted on opposite sides of said body which are the same as the sides on which said hood projects and adapted to engage and hold securely opposite side portions of a cable caught by one of said flukes,
    holding means for releasably holding said grippers in elevated positions on said body with the tops of said grippers inside said projecting portions of said hood and control means for effecting the release of said grippers from said holding means,
    said grippers being adapted to respond to their release by moving out from under said hood and sliding down said body onto opposite side portions of a cable caught by one of said flukes.

2. Equipment for retrieving a cable lying at the bottom of a body of water.
    said equipment including a grapnel comprising a body having means at its upper portion for connection to a line,
    said body having at its lower portion at least two flukes adapted to catch a cable,
    said flukes being disposed on opposite sides of said body,
    said body having at its intermediate portion two grippers adapted to engage and hold securely opposite side portions of a cable caught by one of said flukes,
    holding means for releasably mounting said grippers on opposite sides of said body that are different from the sides on which said flukes are disposed, and control means for effecting the release of said grippers from said holding means, said grippers being adapted to respond to their release by moving down said opposite sides of said body onto opposite side portions of a cable caught by one of said flukes.

3. Equipment in accordance with claim 2 wherein each of said grippers comprises a housing containing two oppositely disposed gripping jaws mounted for sliding movement therein and adapted for grasping a cable portion between them, means for defining converging paths of travel for said jaws whereby the joint movement of said jaws follows a V-shaped path, and means for guiding the sliding movement of said jaws along said converging paths.

4. Equipment in accordance with claim 3 wherein each of said housings is provided with oppositely disposed cover plates, and mounting means for normally holding each cover plate at such an angle that their adjacent edges are deeper inside the housing than their non-adjacent edges whereby said inclined cover plates constitute means on each of said grippers for initially receiving a cable portion.

5. Equipment in accordance with claim 4 wherein said mounting means include pivot means adapted for movement of said adjacent edges of said cover plates to positions deeper into said housing for creating a gap between them adapted for admitting a received cable portion to the interior of said housing and for guiding said received cable portion to a portion between said oppositely disposed gripping jaws.

6. Equipment in accordance with claim 5 and further comprising instrumentalities carried by said mounting means for holding said jaws immovable at the wide end of their V-shaped path of travel, said instrumentalities being adapted to release said jaws in response to the movement of said cover plates to their deeper positions inside said housing.

7. Equipment in accordance with claim 5 and further comprising biasing means in said housing tending to force said jaws to slide toward the narrow end of their V-shaped path of travel, and instrumentalities for controlling the response of said jaws to the influence exerted by said biasing means, said instrumentalities being adapted for holding said jaws immovable at the wide end of their V-shaped path in response to the initial placing of said cover plates in their normal positions, and said instrumentalities being adapted for releasing said jaws in response to the movement of said cover plates to their deeper positions inside said housing.

8. Equipment for retrieving an underwater cable, said equipment comprising a grapnel having a body, at least one fluke attached to said body and adapted for catching an underwater cable, gripping means adapted for securely gripping and holding a cable caught by said fluke, said gripping means being adapted for having a position inoperative for gripping a cable and an alternative position adapted for gripping a cable, mounting means for normally mounting said gripping means on said body in said inoperative position, and control means adapted for effecting the movement of said gripping means from said inoperative position to said operative position.

9. Equipment in accordance with claim 8 wherein said control means comprise tension-responsive means carried inside said grapnel body, said tension-responsive means including means adapted to be actuated by weight and tension applied to said grapnel by a cable caught by said fluke.

10. Equipment in accordance with claim 9 wherein said control means further comprise a core member adapted for sliding movement up and down in said grapnel body, said core member having means attached thereto for receiving a cable caught by said fluke and for consequently receiving the weight and tension applied by said cable.

11. Equipment in accordance with claim 10 wherein said mounting means include latching means for engaging said gripping means, said latching means being so constructed and arranged as to protrude through said grapnel body toward said core member therein, and wherein said core member includes camming means adapted to operate said latching means during said sliding movement of said core member.

12. Equipment for retrieving an underwater cable by inserting a hoist line in series therewith, said equipment comprising a grapnel having at least one hook adapted for catching an underwater cable, said grapnel having two grippers each adapted to grip respectively different portions of a cable engaged by said hook, a hoist line with two ends each fastened to a respectively different one of said grippers, means responsive to the hooking of an underwater cable by said grapnel for applying said grippers to said cable for gripping said respectively different cable portions whereby said hoist line is connected to the cable in parallel therewith, and means subsequently responsive to weight applied to the grapnel by a hooked cable for severing said cable at a point between said gripped cable portions whereby said hoist line becomes inserted in series with said cable.

13. Equipment in accordance with claim 12 and further comprising a grappling line fastened to the middle of said hoist line, a coupler adapted for temporarily holding together intermediate sections of said hoist line and for subsequently releasing them, said coupler including two body portions with one portion having means adapted for connection to said grapnel, each of said body portions having means adapted for connection to a respectively different one of said intermediate hoist line sections, instrumentalities adapted for detachably connecting said two body portions, and control means responsive to tension applied to one of said intermediate hoist line sections for operating said instrumentalities for effecting the disconnection of said two body portions.

14. Equipment in accordance with claim 13 wherein said instrumentalities include a pair of pins juxtaposed in axial alignment, said pins being mounted in one of said body portions, a plunger having a tapered end normally inserted between ends of said pins, said plunger being mounted in one of said body portions, and biasing means for normally forcing said ends of said pins against said plunger.

15. Equipment in accordance with claim 13 wherein said instrumentalities include a pair of pins juxtaposed in axial alignment, said pins being mounted for sliding movement in one of said body portions, means for forcing said pins to slide apart from each other, said means comprising a plunger having a tapered end normally inserted between ends of said pins, biasing means for normally forcing said ends of said pins against said plunger, said plunger being mounted for sliding movement in one of said body portions, and wherein said control means include means responsive to tension applied to one of said intermediate hoist line sections for sliding said plunger further between said pins.

16. Equipment in accordance with claim 13 wherein said instrumentalities include a pair of pins mounted for sliding movement in one of said body portions,
a second pair of pins mounted for sliding movement in the other of said body portions,
said four pins being all juxtaposed in axial alignment,
a plunger having a tapered end normally inserted between ends of the pins in one of said pairs,
said pins in the other of said pairs having a locking position for locking said body portions together and an unlocking position for unlocking said body portions,
and biasing means for normally holding said last-mentioned pair of pins in their locking position.

17. Equipment in accordance with claim 16 wherein said control means comprise means for moving said last-mentioned pair of pins from their locking position to their unlocking position,
said last-mentioned means including a member having a camming surface adapted for sliding said plunger further between the pins of its associated pair,
said member being pivotally mounted in one of said body portions,
and operating means for pivotally moving said member and its camming surface,
said operating means including means for applying tension from one of said intermediate hoist line sections to a portion of said member.

18. Equipment for retrieving an underwater cable,
said equipment including a grapnel comprising a body having means defining at least one slot therein,
at least one fluke adapted for catching an underwater cable,
means for securing said fluke to said body at a point adjacent to said slot for guiding a caught cable into said slot and into the interior of said body,
receiving means in the interior of said body for receiving a cable guided through said slot,
cutting means in the interior of said body adapted for severing a cable guided therein,
said cutting means having an inoperative position,
tension-responsive means in the interior of said body adapted for normally holding said cutting means in its inoperative position,
said receiving means being adapted for applying tension from a received cable to said tension-responsive means,
and control means responsive to the application by said receiving means of an assigned degree of cable tension to said tension-responsive means for moving said cutting means out of its inoperative position and into cutting engagement with a received cable.

19. Equipment in accordance with claim 18 wherein said cutting means include a guillotine blade,
wherein said receiving means include means for slidably receiving said guillotine blade for independent sliding movement thereof,
wherein said body includes means for slidably receiving said receiving means for sliding movement thereof in response to tension applied thereto by a cable received therein,
wherein said tension-responsive means are adapted for opposing at least partially said sliding movement of said receiving means,
and wherein said control means include means for sliding said guillotine blade independently within said receiving means.

20. Equipment for retrieving an underwater cable,
said equipment including a grapnel adapted for severing an underwater cable and for retaining the severed ends thereof,
said grapnel comprising a body having means for engaging an underwater cable,
at least two grippers each adapted to grip and retain respectively different portions of a cable engaged by said grapnel,
means for pivotally attaching said grippers to said body,
releasing means operationally responsive to the engagement of a cable by said grapnel for releasing said grippers,
said grippers being adapted for pivotal movement onto said cable portions in response to the operation of said releasing means,
cutting means operationally responsive to the engagement of a cable by said grapnel for severing said cable,
and control means for delaying the severance of said cable until after the operation of said releasing means.

21. Equipment for retrieving an underwater cable,
said equipment comprising a grapnel adapted to sever an underwater cable and to retain the severed ends thereof,
said grapnel having at least one hook adapted to engage an underwater cable,
said grapnel also having a body,
fastening means for securing said hook to the lower part of said body,
means defining at least one slot in said body for receiving therein a cable engaged by said hook,
said grapnel also having at least two grippers each adapted to grip and retain respectively different portions of a cable engaged by said hook,
means for pivotally attaching said grippers in upright positions to opposite sides of the upper part of said body,
cutting means positioned within said body and adapted for severing a cable received within said slot,
tension-responsive means responsive to tension produced by the reception within said slot of a cable engaged by said hook,
control means for moving said grippers downward for engaging opposite sides of a cable in said slot,
said control means being adapted to be actuated by said tension-responsive means in response to the application thereto of a preassigned degree of tension,
and additional control means for operating said cutting means for severing a cable in said slot,
said additional control means being adapted to be actuated by said tension-responsive means in response to the application thereto of a larger preassigned degree of tension.

22. The method of connecting a hoist line in series with an underwater cable,
said hoist line having two ends,
said method comprising the steps of locating and catching an underwater cable,
clamping each end of said hoist line to a respectively different portion of said caught cable,
said different clamped cable portions being separated by an intermediate portion of said cable,
and severing said intermediate cable portion.

References Cited by the Examiner

UNITED STATES PATENTS 3,122,046  2/1964  Baker et al. _____________ 83—925

FOREIGN PATENTS 791,130  2/1958  Great Britain.

WILLIAM W. DYER, Jr., *Primary Examiner.*

L. B. TAYLOR, *Assistant Examiner.*